United States Patent
Chung et al.

(10) Patent No.: US 8,973,746 B2
(45) Date of Patent: Mar. 10, 2015

(54) HYDROGEN STORAGE APPARATUS WITH HEAT-DISSIPATING STRUCTURE

(71) Applicant: National Central University, Jhongli, Taoyuan County (TW)

(72) Inventors: Chih-Ang Chung, Jhongli (TW); Teng-Yi Huang, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 0 days.

(21) Appl. No.: 13/840,127

(22) Filed: Mar. 15, 2013

(65) Prior Publication Data

US 2014/0061066 A1 Mar. 6, 2014

(30) Foreign Application Priority Data

Sep. 6, 2012 (TW) .............................. 101132492 A

(51) Int. Cl.
*B65D 85/00* (2006.01)
*F17C 1/00* (2006.01)
*B01D 53/053* (2006.01)
*F17C 1/12* (2006.01)

(52) U.S. Cl.
CPC . *F17C 1/12* (2013.01); *Y02E 60/321* (2013.01)
USPC ............. 206/0.6; 62/46.2; 96/126; 220/560.1

(58) Field of Classification Search
USPC ............... 206/0.6, 0.7; 62/45.1–46.3; 96/108, 96/121, 126, 146; 220/560.04–560.15, 220/581–592
See application file for complete search history.

(56) References Cited

U.S. PATENT DOCUMENTS

| | | | | |
|---|---|---|---|---|
| 4,964,524 A * | 10/1990 | Halene | ........................... | 206/0.7 |
| 6,742,650 B2 * | 6/2004 | Yang et al. | ..................... | 206/0.7 |
| 6,991,770 B2 * | 1/2006 | Suzuki et al. | ................... | 96/108 |
| 6,993,888 B2 * | 2/2006 | Yang et al. | ..................... | 206/0.7 |
| 7,320,726 B2 | 1/2008 | Shih et al. | | |
| 7,418,782 B2 * | 9/2008 | Kimbara et al. | ............... | 206/0.7 |
| 7,431,756 B2 | 10/2008 | Myasnikov et al. | | |
| 7,946,446 B2 * | 5/2011 | Kimbara et al. | ............... | 62/46.3 |
| 8,636,836 B2 * | 1/2014 | Mudawar et al. | ............... | 96/146 |
| 8,646,597 B2 * | 2/2014 | Yang et al. | ..................... | 206/0.7 |
| 2012/0132545 A1 * | 5/2012 | Lee et al. | ........................ | 206/0.6 |
| 2012/0160711 A1 * | 6/2012 | Yang et al. | ..................... | 206/0.6 |
| 2012/0211376 A1 * | 8/2012 | Chung et al. | ................... | 206/0.7 |

FOREIGN PATENT DOCUMENTS

| | | |
|---|---|---|
| CN | 201339807 Y | 11/2009 |
| TW | 515879 B | 1/2003 |
| TW | I267605 B | 12/2006 |

* cited by examiner

*Primary Examiner* — Bryon Gehman
(74) *Attorney, Agent, or Firm* — Muncy, Geissler, Olds & Lowe, P.C.

(57) ABSTRACT

A hydrogen storage apparatus includes a canister and at least one hydrogen storage unit. The canister has at least a hollow rod. The hydrogen storage unit is disposed in the canister. The hydrogen storage unit includes a housing, a heat-dissipating channel and a plurality of heat-dissipating partitions. The periphery of the housing is configured with a plurality of grooves, and each groove has a plurality of first holes. The heat-dissipating channel is located within the housing. Each heat-dissipating partition has a plurality of second holes and connects to the housing and heat-dissipating channel. The heat-dissipating partitions divide the space inside the housing. The first holes and the second holes connect to the inner space of the housing.

13 Claims, 7 Drawing Sheets

HYDROGEN STORAGE APPARATUS WITH HEAT-DISSIPATING STRUCTURE

CROSS REFERENCE TO RELATED APPLICATIONS

This Non-provisional application claims priority under 35 U.S.C. §119(a) on Patent Application No(s). 101132492 filed in Taiwan, Republic of China on Sep. 6, 2012, the entire contents of which are hereby incorporated by reference.

BACKGROUND OF THE INVENTION

1. Field of Invention

The present invention relates to a gas storage apparatus and, in particular, to a hydrogen storage apparatus.

2. Related Art

Recently, hydrogen has been widely applied to the industrial manufacturing processes, and the specifications in the fields of manufacturing, storage, transportation and application thereof have been gradually specified perfectly. The current hydrogen storage technology mainly includes the liquefied hydrogen storage, the high-pressure hydrogen storage, the metal hydride hydrogen storage, the alloy hydrogen storage, and the like. However, when the hydrogen is stored either in a low-temperature liquid state or a high-pressure gaseous state, a lot of energy has to be consumed to liquefy or compress the hydrogen. In addition, the excellent low-temperature insulating device or the specific thick and heavy high-pressure bottle has to be provided to serve as the storage container. Thus, the costs for these two hydrogen storage apparatuses are very high.

The conventional hydrogen container usually contains metal alloy powders for storing hydrogen. The metal alloy can store hydrogen within the lattice structure of the metal so as to form metal hydride compounds. The hydrogen absorbing or releasing procedure will be company with corresponding endothermic or exothermic chemical reaction. This hydrogen storage method has the following advantages. The hydrogen storage density is high, the reaction can be performed at room temperature and without high pressure, the safety of the hydrogenised product is high, the doubt of explosion is absent, and the highly-pure hydrogen can be obtained. So, the metal alloy hydrogen storage method has gradually become the important direction of research in the current hydrogen storage technology.

However, the hydrogen absorption capacity of the metal alloy is limited. In general, the hydrogenation procedure of the metal alloy can release heat, which should be effectively removed to maintain the following hydrogen storage performance. To seek for higher hydrogen storage performance, it is desired to develop a novel hydrogen storage container having higher thermal conduction efficiency. Taiwan Patent No. I267,605 discloses a popular hydrogen storage apparatus, which has a honeycomb structure for enhancing the thermal conduction efficiency. However, this disclosed structure is very complicated and difficult in fabrication.

Therefore, it is an important subject to provide a hydrogen storage apparatus that can effectively increase the thermal conduction efficiency during absorbing or releasing hydrogen.

SUMMARY OF THE INVENTION

In view of the foregoing subject, an objective of the present invention is to provide a hydrogen storage apparatus that can effectively increase the thermal conduction efficiency during absorbing or releasing hydrogen.

To achieve the above objective, the present invention discloses a hydrogen storage apparatus comprising a canister and at least one hydrogen storage unit. The canister has at least a hollow rod. The hydrogen storage unit is disposed in the canister and includes a housing, a heat-dissipating channel and a plurality of heat-dissipating partitions. The periphery of the housing is configured with a plurality of grooves, and each of the grooves has a plurality of first holes. The heat-dissipating channel is located within the housing, and the hollow rod passes through the heat-dissipating channel. The heat-dissipating partitions have a plurality of second holes and connect to the housing and the heat-dissipating channel. The heat-dissipating partitions divide the inner space of the housing, and the first and second holes connect to the inner space of the housing.

In one embodiment, the grooves are separately disposed.

In one embodiment, the shape of the housing fits the canister, and the cross-section of the housing is a circle, an ellipsoid or a polygon.

In one embodiment, the hydrogen storage apparatus further comprises a cap, which has an opening and is tightly connected with the canister.

In one embodiment, the cap comprises a top cap body and a bottom cap body. The top cap body and the bottom cap body are engaged with each other, and a gas route is configured between the top cap body and the bottom cap body.

In one embodiment, the heat-dissipating partitions are arranged in net, radiating shape, or grid.

In one embodiment, the housing has an engagement structure.

In one embodiment, when the hydrogen storage apparatus comprises a plurality of the hydrogen storage units, the hydrogen storage units are stacked and mounted on the hollow rod by the engagement structure.

In one embodiment, the grooves of adjacent hydrogen storage units are aligned with each other.

In one embodiment, the hydrogen storage unit further comprises a filtering element disposed on the first holes and having a plurality of filter holes.

In one embodiment, the diameter of the filter holes of the filtering element is between 0.5 μm and 1 μm.

In one embodiment, the hydrogen storage apparatus further comprises at least a sealing element disposed at the cap and the hydrogen storage unit.

In one embodiment, the hydrogen storage apparatus further comprises at least an elastic element telescoped on the hollow rod and contacted against the hydrogen storage unit.

As mentioned above, the hydrogen storage unit of the hydrogen storage apparatus of the invention is made of the material with high thermal conductivity, and the heat-dissipating partitions of the hydrogen storage unit can evenly divide the inner space of the housing. Accordingly, the heat generated in the hydrogen absorbing and releasing procedures can be conducted or removed from inside to outside or from outside to inside, thereby improving the thermal conduction efficiency of the hydrogen storage apparatus. In addition, since the heat-dissipating partition is configured with the second holes, hydrogen contained in the compartments of the hydrogen storage unit can rapidly follow in lateral so as to homogenously distribute in the hydrogen storage materials. This configuration can improve the hydrogen absorbing and releasing rates. Moreover, the grooves are configured with first holes and form radial hydrogen channels between the hydrogen storage unit and the housing, so that the hydrogen contained in the hydrogen storage unit can enter the radial hydrogen channels through the first holes and then flow longitudinally. Thus, the distribution of the hydrogen in the entire canister will be more uniform, and the poor gas fluidness can be prevented.

Furthermore, the hydrogen storage units can be stacked, so that the number of the hydrogen storage units can be freely adjusted according to the size of the canister and the required hydrogen capacity. Besides, the hydrogen storage powders can be separately arranged. If the hydrogen storage powders are stacked too high, the bottom powders of the hydrogen storage units will be compressed by the upper expanded powders during the hydrogen absorption procedure so as to decrease the stress release by expending upwardly of the bottom powders. Simultaneously, the stresses applied to the side wall or bottom of the hydrogen storage unit increase, which may potentially damage the hydrogen storage units. Moreover, the powders in the hydrogen storage units may be cracked after a certain number of hydrogen absorb-release cycles, so that the particle size of the powder becomes smaller. When the powders are stacked too high, the bottom powders will be compressed by the upper powders and thus easily be agglomerated. Since the hydrogen storage apparatus of the invention can separately arrange the hydrogen storage powders, the above issues about stresses and powder agglomeration can be solved.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
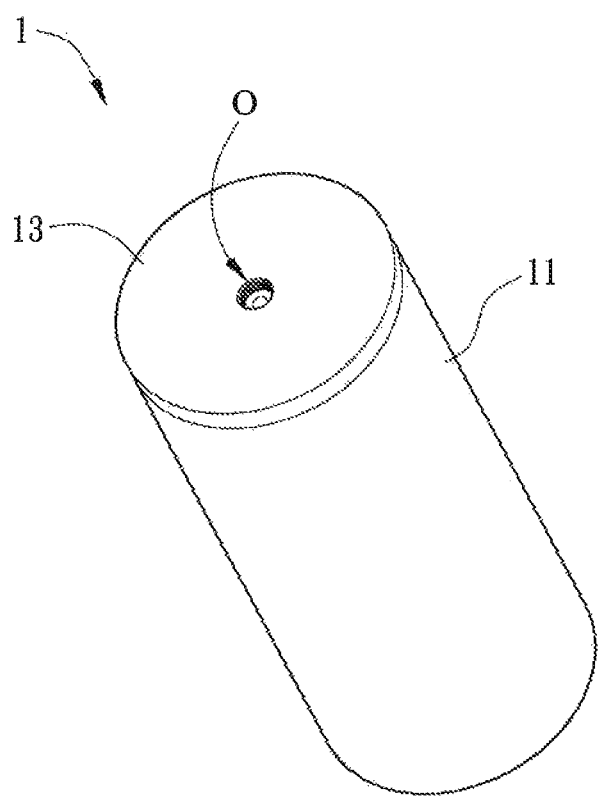
FIG. 1A is a schematic diagram of a hydrogen storage apparatus according to an embodiment of the invention.
Figure 1B:
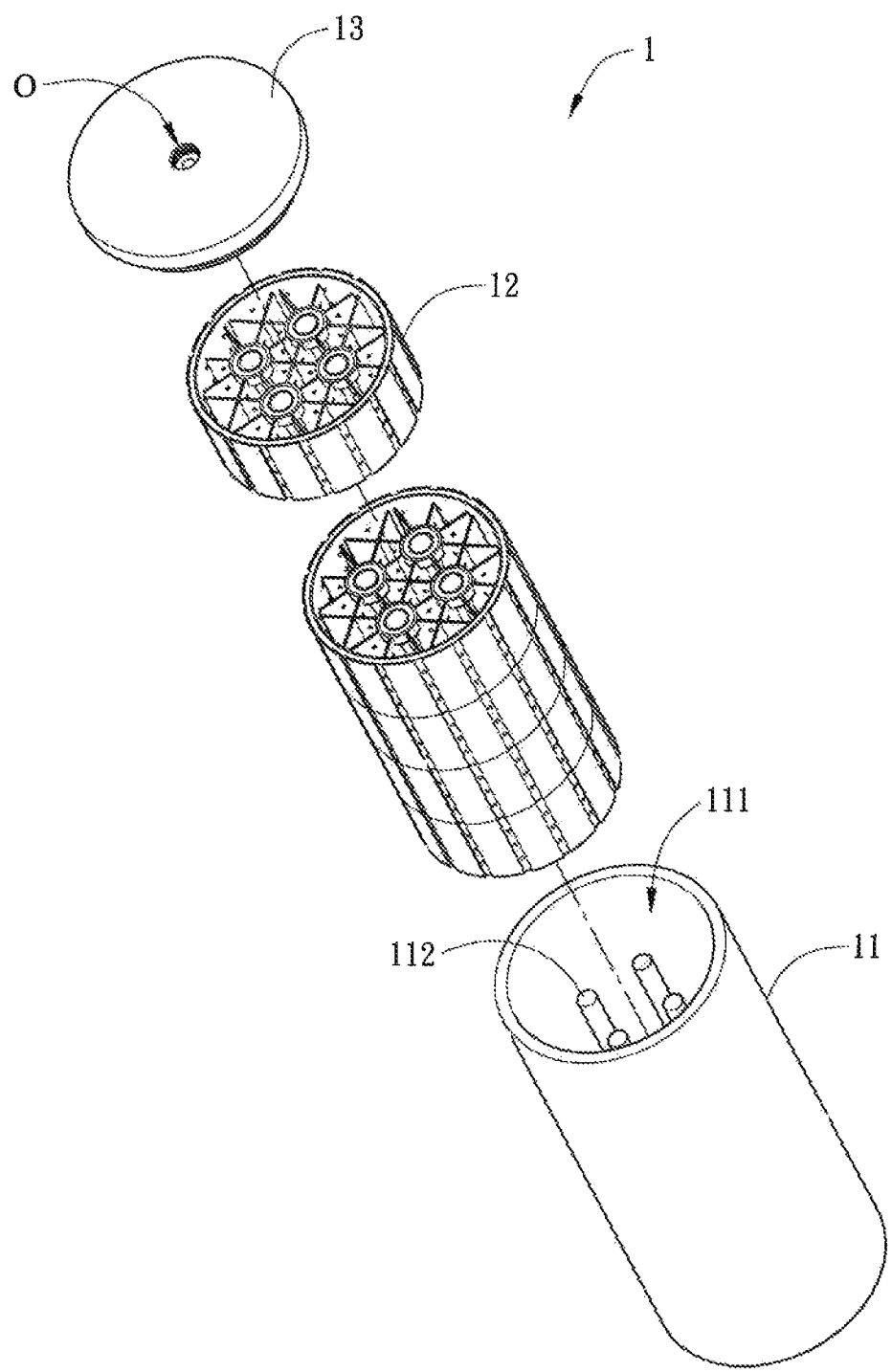
FIG. 1B is an exploded view of the hydrogen storage apparatus of FIG. 1A.

FIG. 1A is a schematic diagram of a hydrogen storage apparatus 1 according to an embodiment of the invention, and FIG. 1B is an exploded view of the hydrogen storage apparatus 1 of FIG. 1A. Referring to FIGS. 1A and 1B, the hydrogen storage apparatus 1 includes a canister 11 and at least one hydrogen storage unit 12. The cross-section of the canister 11 is, for example but not limited to, a circle, an ellipsoid, a square, a pentagon, a hexagon, or other polygons. The center of the canister 11 is configured with a space 111. In this embodiment, the canister 11 is a hollow rod, and the cross-section thereof is a circle. Five hydrogen storage units 12 are provided, and the size of the canister 11 is large enough to accommodate all of the five hydrogen storage units 12. Of course, the canister 11 may have different sizes depending on the number of the hydrogen storage units 12.

The hydrogen storage apparatus 1 preferably has an airtight circumstance for preventing the internal gas or hydrogen storage material (e.g. hydrogen storage alloy, metal hydride, or composite hydride) from leaking to outside. Thus, the hydrogen storage apparatus 1 further includes a cap 13, which can tightly connected with one end of the canister 11. The other end of the canister 11 is a bottom. The cap 13 has an opening O, so that hydrogen can enter or exit the canister 11 through the opening O. The periphery of the cap 13 is well designed to tightly connect with the canister 11 for preventing the hydrogen storage material or hydrogen remained in the hydrogen storage units 12 from leaking. The bottom of the canister 11 has a hollow rod 112 extending toward the cap 13, and a heat pipe is allowed to insert into the hollow rod 112. The hollow rod 112 is made of a material with high thermal conductivity. Thus, during the hydrogen absorbing or releasing procedure, the hydrogen storage material can rapidly conduct the heat around the canister 11. One end of the hollow rode 112 disposed on the bottom of the canister 11 is communicated with outside, while the other end thereof is closed. Accordingly, the stored hydrogen or hydrogen storage material will not leak or dissipate from the hydrogen storage apparatus 1 through the hollow rod 112. The hollow rod 112 has a hollow structure with the shape of, for example, a circle, a square, or a polygon. The number of the hollow rods 112 of the canister 11 is not limited, and it may be two, three, four or more. Any number of the hollow rods 112 that can achieve better heat conduction rate and efficiency is acceptable, and this invention is not limited.

Figure 2A:
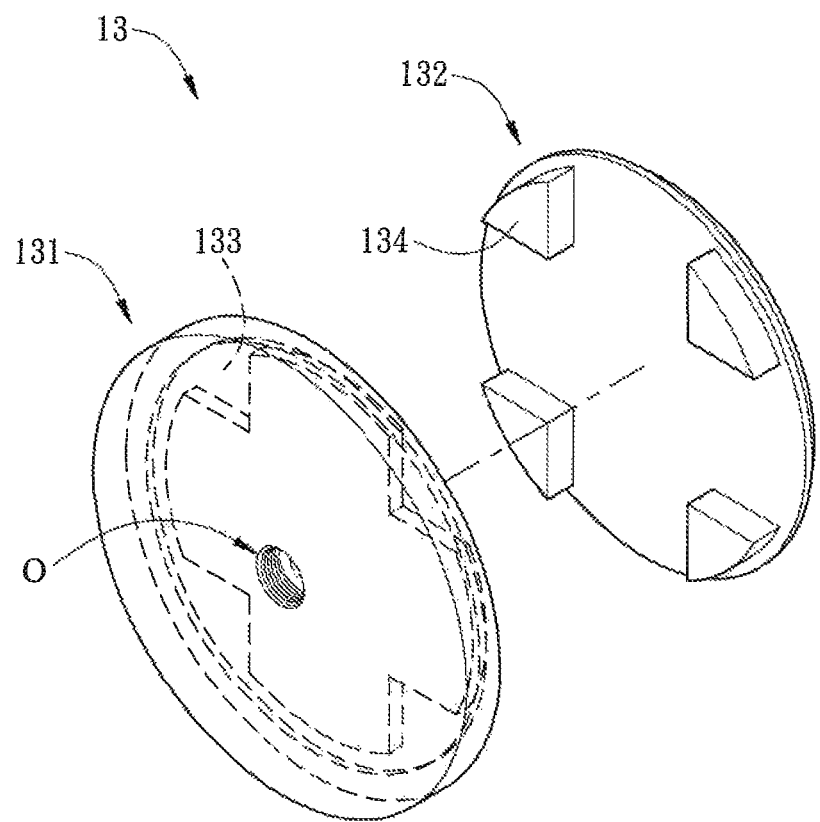
FIG. 2A is an exploded view of a cap according to an embodiment of the invention.
Figure 2B:
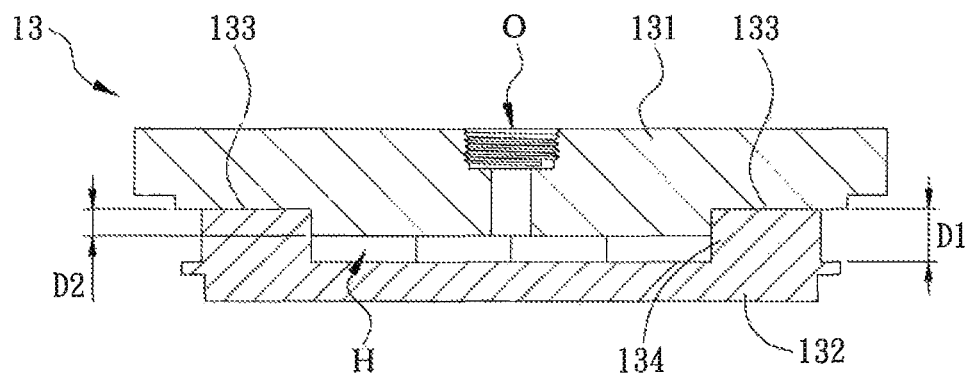
FIG. 2B is a sectional view of the cap of FIG. 2A.

In one embodiment of the invention, the cap 13, as shown in FIG. 2A, may further include a top cap body 131 and a bottom cap body 132. The edge of the top cap body 131 is capable of tightly connect with the canister 11, and the top cap body 131 has an opening O, which allows hydrogen to enter or exit the canister 11. The bottom cap body 132 is tightly connected with the hydrogen storage unit 12 for preventing the hydrogen storage material located inside the canister 11 from leaking through the junction of the cap 13 and the canister 11. Preferably, the top cap body 131 and the bottom cap body 132 are partially engaged with each other, and a gas route H is configured therebetween so that hydrogen can freely flow through the opening O. In this embodiment, the top cap body 131 has a plurality of recesses 133, and the bottom cap body 132 has a plurality of protrusions 134. The shapes of the recesses 133 and the protrusions 134 match with each other, so that the top cap body 131 is partially engaged with the bottom cap body 132. Otherwise, as shown in FIG. 2B, the height D1 of the protrusion 134 is larger than the depth D2 of the recess 133. In this case, the gas route H is formed between the top cap body 131 and the bottom cap body 132 after the top cap body 131 and the bottom cap body 132 are engaged with each other. This configuration allows the top cap body 131 and the bottom cap body 132 to tightly connect with the canister 11 and the hydrogen storage unit 12 for preventing the undesired loss of the hydrogen storage material, and to simultaneously provide a gas route H. Accordingly, the hydrogen generated by the hydrogen storage unit 12 can be outputted through the opening O, and the hydrogen source can enter the hydrogen storage unit 12 through the opening O. The flowing of hydrogen in the canister 11 and the flowing route through the opening O will be described hereinafter.

Figure 3A:
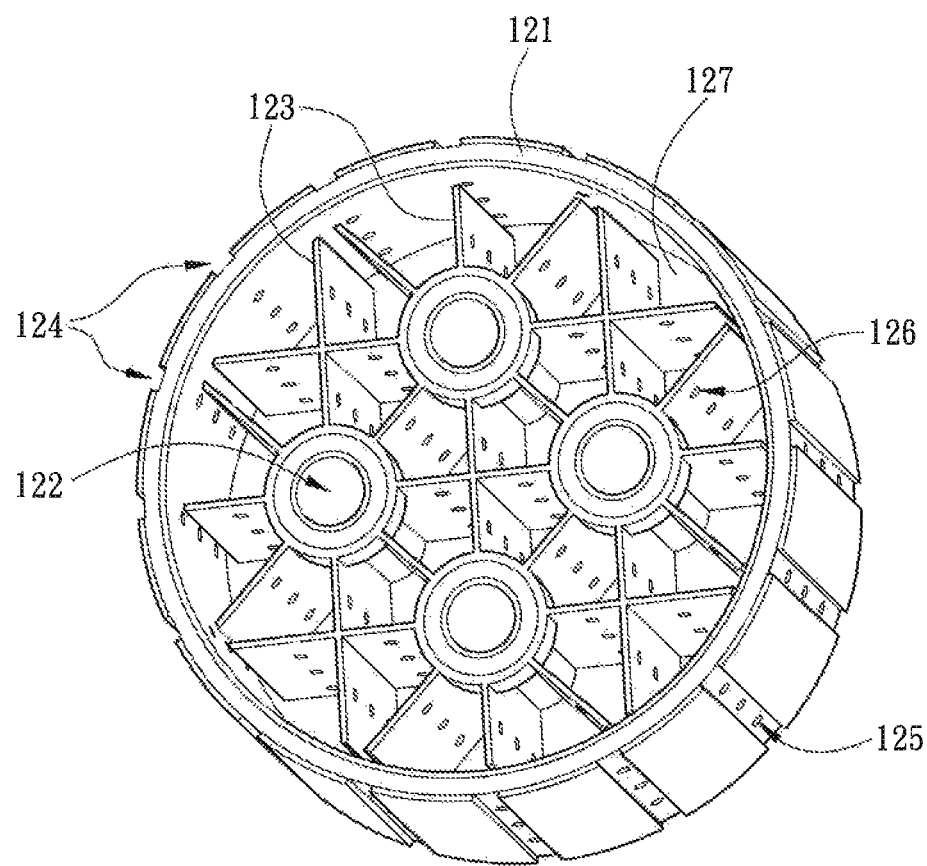
FIG. 3A is a schematic diagram of a hydrogen storage unit according to an embodiment of the invention.
Figure 3B:
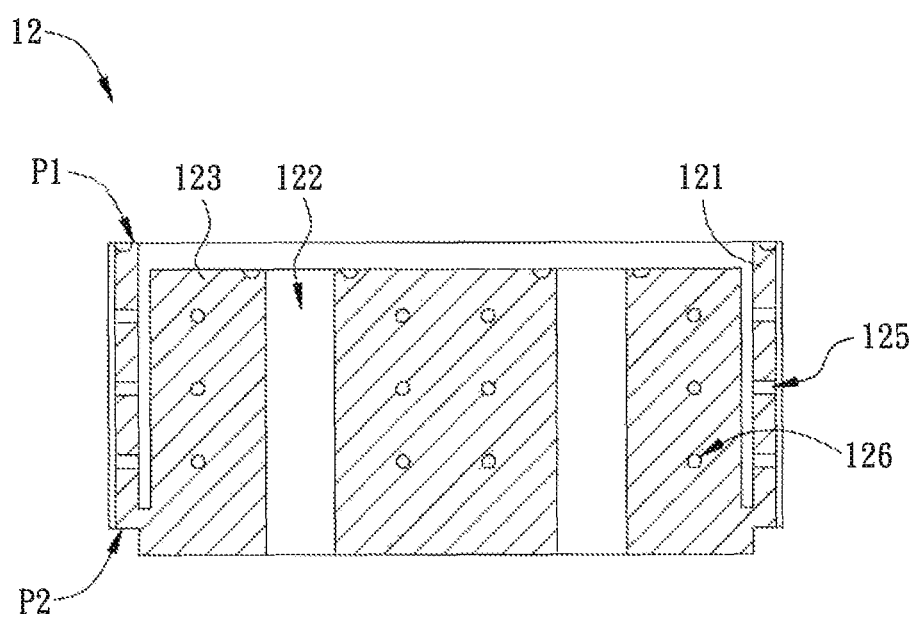
FIG. 3B is a sectional view of the hydrogen storage unit of FIG. 3A.

FIG. 3A is a schematic diagram of a hydrogen storage unit 12 according to an embodiment of the invention, and FIG. 3B is a sectional view of the hydrogen storage unit 12 of FIG. 3A.

Referring to FIGS. 3A and 3B, the hydrogen storage unit 12 includes a housing 121, a heat-dissipating channel 122, and a plurality of heat-dissipating partitions 123. The housing 121, the heat-dissipating channel 122, and the heat-dissipating partitions 123 are all made of a metal or alloy, which has good thermal conductivity. The shape of the housing 121 of the hydrogen storage unit 12 matches that of the canister 11 and is slightly smaller than the inner diameter of the canister 11, so that the hydrogen storage unit 12 can be accommodated within the inner space 111 of the canister 11. In this case, the housing 121 has a flat circular box structure. The periphery of the housing 121 is configured with a plurality of grooves 124, which are vertically extended at the opposite edges of the housing 121. The grooves 124 are separately configured and concentrated at one side or opposite two sides of the housing 121. Alternatively, the grooves 124 may be evenly disposed at the periphery of the housing 121 with equivalent intervals. In this embodiment, the grooves 124 are evenly disposed with equivalent intervals. Moreover, the housing 121 further includes a plurality of first holes 125, which are preferably disposed linearly within the grooves 124, so that the inner space of the housing 121 is connected with the grooves 124 through the first holes 125.

A heat-dissipating channel 122 and a plurality of heat-dissipating partitions 123 are located within the housing 121. The shape and dimension of the heat-dissipating channel 122 substantially match with those of the hollow rod 112. Accordingly, the hollow rod 112 passes through the heat-dissipating channel 122 to facilitate the heat conduction of the hydrogen storage unit 12. In this embodiment, the hydrogen storage apparatus 1 includes four hollow rods 112, and four heat-dissipating channels 122 are configured correspondingly. In addition, the housing 121 has a bottom plate 127, so that the heat-dissipating partitions 123 of different hydrogen storage units 12 can be isolated. In this embodiment, the bottom plate 127 and the housing 121 are integrally formed as one piece, and the space formed by the housing 121 can be used to carry the hydrogen storage material. The bottom plate 127 has a through hole corresponding to the heat-dissipating channel 122, so that the heat-dissipating channel 122 is not sealed.

The heat-dissipating partitions 123 may directly or indirectly connect to the heat-dissipating channel 122 and the housing 121. In this embodiment, the heat-dissipating partitions 123 directly connect to the heat-dissipating channel 122 and are composed of several plate structures. The heat-dissipating partitions 123 are dynamically assembled in a shape of, for example but not limited to, a net, a radiating shape (around the heat-dissipating channel 122), or a grid. Otherwise, the heat-dissipating partitions 123 may be integrally formed by plate structures in any of the above-mentioned shapes. Accordingly, the inner space of the housing 121 can be divided into more small compartments by the heat-dissipating partitions 123, and the compartments preferably have similar sizes. Of course, in different embodiment, the heat-dissipating partition 123 may only connect two heat-dissipating channels 122; otherwise, one end of the heat-dissipating partition 123 is connected with the heat-dissipating channel 122 or the housing 121, while the other end thereof is connected with another heat-dissipating partition 123 so as to further divide the inner space of the housing 121. Moreover, the heat-dissipating partitions 123 have a plurality of second holes 126 for communicating the adjacent compartments. The number and configuration of the second holes 126 are adjustable depending on different requirements. The diameters of the first holes 125 and the second holes 126 can be the same or different, and they are substantially between 1 mm and 3 mm. In a preferred embodiment, the diameters of the first holes 125 and the second holes 126 are both 2 mm.

The heat-dissipating channel 122 of the hydrogen storage unit 12 is telescoped on the hollow rode 112, so that the hydrogen storage unit 12 can be accommodated within the canister 11. The heat-dissipating partitions 123 separate the hydrogen storage material in several compartments, and the hydrogen can freely flow between the compartments through the second holes 126. Accordingly, the hydrogen can rapidly and uniformly flow and distribute in the hydrogen storage material of the hydrogen storage unit 12, thereby improving the hydrogen absorbing and releasing efficiency of the hydrogen storage material.

Besides, after the hydrogen storage unit 12 is disposed in the canister 11, the grooves 124 disposed on the periphery of the housing 121 and the inner wall of the canister 11 can form a radial hydrogen channel, which is substantially parallel to the heat-dissipating channel 122. The first holes 125 in the grooves 124 are also communicated with the inner space of the housing 121. Accordingly, during the hydrogen absorbing or releasing procedure, the hydrogen can flow between the compartments and the opening O of the cap 13 through the first holes 125 and the radial hydrogen channel. Through this provided route, the hydrogen can flow into or out of the hydrogen storage apparatus 1.

The flowing route of hydrogen through the opening O will be described hereinafter. In one embodiment, the cap 13 of the hydrogen storage apparatus 1 has a top cap body 131 and a bottom cap body 132 (see FIGS. 2A and 2B), and a gas channel H is formed between the top cap body 131 and the bottom cap body 132. When the edge of the bottom cap body 132 is tightly connected with the housing 121 of the hydrogen storage unit 12, the gas channel H is communicated with the radial hydrogen channel, so that the hydrogen can enter or exit the hydrogen storage unit 12 through the opening O, the gas channel H and the radial hydrogen channel.

Figure 4A:
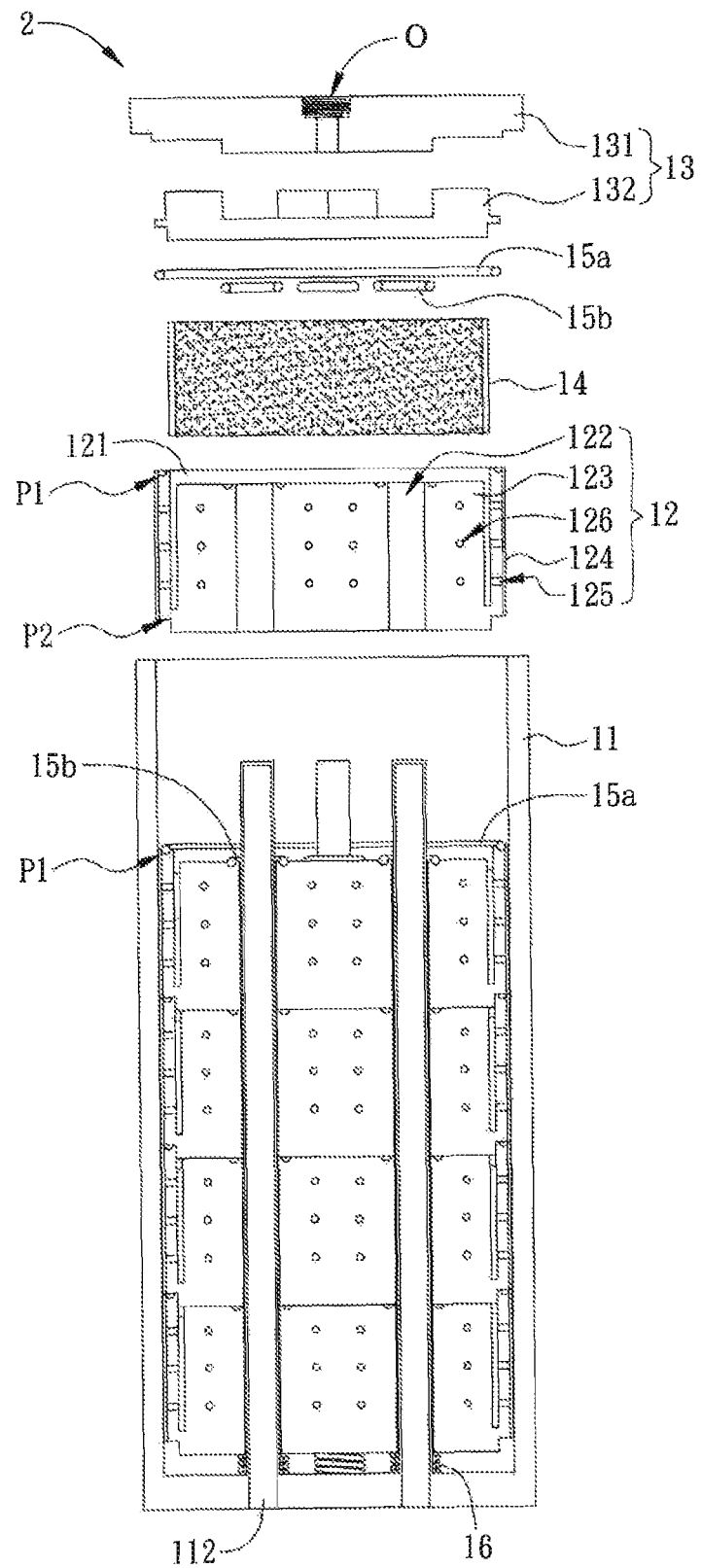
FIG. 4A is an exploded view of a hydrogen storage apparatus according to another embodiment of the invention.

Another hydrogen storage apparatus 2 includes a plurality of hydrogen storage units 12, which can assembled with each other. To be noted, when the hydrogen storage units 12 are stacked, the heat-dissipating channels 122 and the grooves 124 of different hydrogen storage units 12 are arranged corresponding to each other, so that the heat-dissipating channels 122 can extend longitudinally. Thus, the hollow rod 112 can pass through the extended heat-dissipating channels 122, and the radial hydrogen channel formed by the grooves 124 can connect to the extended heat-dissipating channels 122 for providing the hydrogen to flow through. The housings 121 of the hydrogen storage units 12 further have an engagement structure for facilitating the stacking operation of the hydrogen storage units 12. Referring to FIGS. 3B and 4A, the engagement structure includes an engaging protrusion P1 and an engaging recess P2. The engaging protrusion P1 is disposed at one end of the housing 121, while the engaging recess P2 is disposed at the other end of the housing 121. As shown in FIG. 4A, the engaging protrusion P1 of one hydrogen storage unit 12 is engaged with the engaging recess P2 of another hydrogen storage unit 12, so that the two hydrogen storage units 12 are stacked. In this case, the bottom plate 127 of the top hydrogen storage unit 12 is tightly connected with the inner edge of the housing 121 of the lower hydrogen storage unit 12, and the surface of the heat-dissipating partitions 123 of the lower hydrogen storage unit 12 contacts against the surface of the bottom plate 127 of the top hydrogen storage unit 12. After mounting the heat-dissipating channels 122 of two hydrogen storage units 12 on the hollow rod 112 to dispose the hydrogen storage units 12 in the canister 11, the hydrogen of one hydrogen storage unit 12 can flow into the other hydrogen storage unit 12 through the radial hydrogen channel. As a result, the hydrogen and pressure of the hydrogen storage units 12 of the entire hydrogen storage apparatus 2 can reach a uniform status. Besides, the hydrogen storage material can be evenly distributed in the stacked hydrogen storage units 12, which can avoid the caking phenomena in the conventional art. In the conventional art, if the hydrogen storage powders are stacked too high, the hydrogen storage powders may expand to generate stack stress and undesired caking phenomena.

Figure 4B:
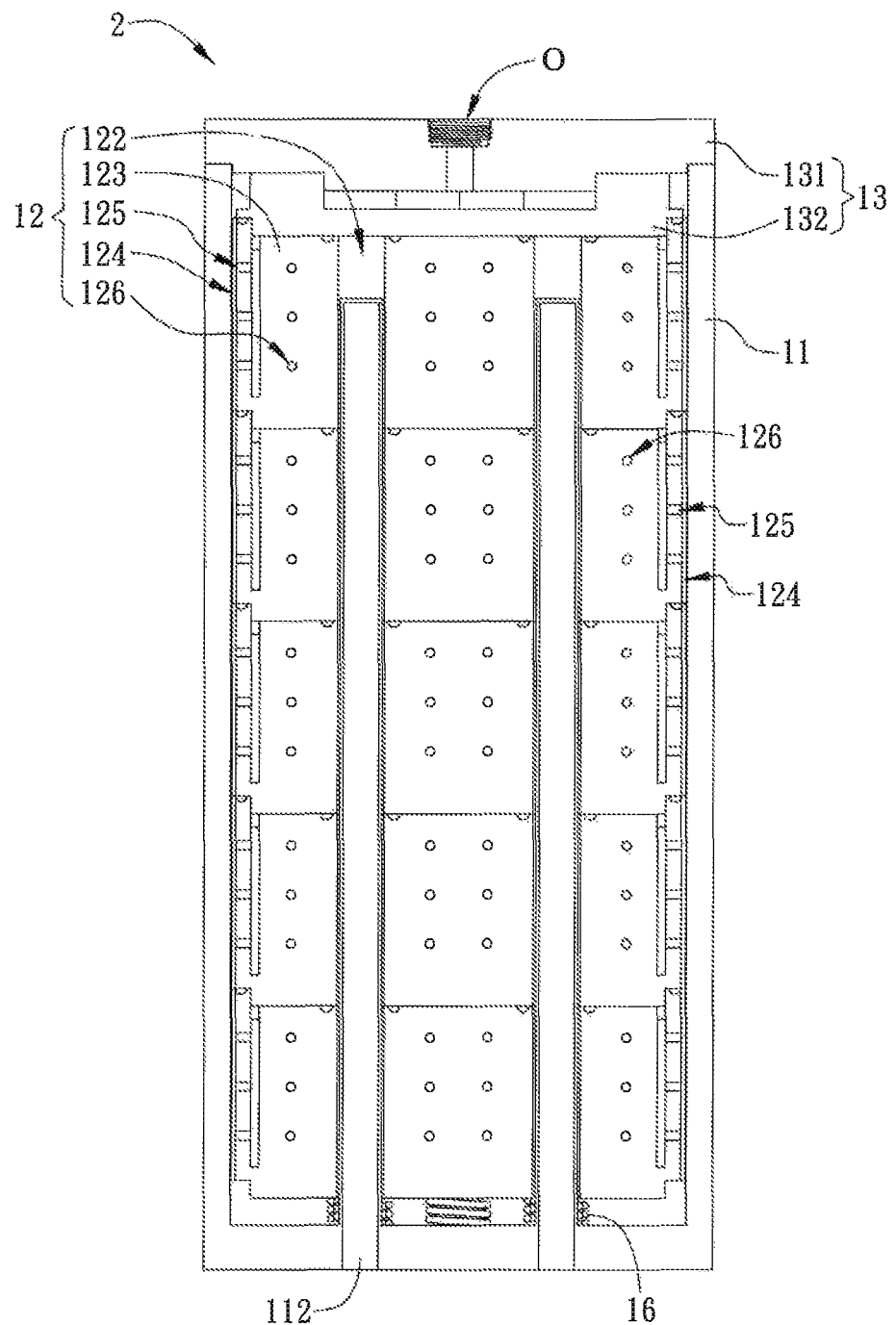
FIG. 4B is a sectional view of the hydrogen storage apparatus of FIG. 1A.

To prevent the brittle hydrogen storage material from leaking through the first holes 125, the hydrogen storage unit 12 may further include a filtering element 14. Referring to FIGS. 4A and 4B, the filtering element 14 has a plurality of filter holes, and the diameter of the filter holes is substantially smaller than the particle diameter of a single hydrogen storage powder. In general, the diameter of the filter holes is between 0.5 μm and 1 μm. The filtering element 14 has a plate shape or an annular shape, and is disposed adjacent to the housing 121 for covering all first holes 125. The position of the filtering element 14 is not limited, and it can be disposed on the inner wall of the outer surface of the housing 121. In this embodiment, the filtering element 14 is an annular filter net, and is disposed in the housing 121 between the heat-dissipating partition 123 and the housing 121.

Besides, the hydrogen storage apparatus 2 may further include at least one sealing element for providing a better sealing status. The sealing element can be made of rubber, viton or silica gel. Referring to FIGS. 4A and 4B, the hydrogen storage apparatus 2 has a sealing element 15a disposed between the engaging recess P2 of one hydrogen storage unit 12 and the engaging protrusion P1 of another hydrogen storage unit 12. When two hydrogen storage units 12 are assembled, the sealing element 15a is compressed and thus fully fills the gap therebetween. In this embodiment, the sealing element 15a is an O-ring. In addition, another sealing element 15b is configured between the heat-dissipating channels 122 of two hydrogen storage units 12. Similarly, sealing elements 15a and 15b can be configured between the cap 13 and the top hydrogen storage unit 12. The configuration of the sealing elements 15a and 15b can enhance the sealing state of two hydrogen storage units 12, thereby preventing the hydrogen storage material in the hydrogen storage unit 12 from leaking to the space 111 between the hydrogen storage unit 12 and the canister 11.

With reference to FIGS. 4A and 4B, the hydrogen storage apparatus 2 may further include at least an elastic element 16 to improve the sealing status thereof. The elastic element 16 is disposed between the bottom plate 127 of the hydrogen storage unit 12 and the bottom of the canister 11. The elastic element 16 provides a force to support the hydrogen storage unit 12 so as to improve the sealing status between the hydrogen storage units 12 and between the hydrogen storage unit 12 and the cap 13. The elastic element 16 can be disposed on all or some hollow rods 112, and one or more elastic elements 16 can be configured on a single hollow rod 112 for the sake of providing enough support force to seal the hydrogen storage unit(s) 12.

In summary, the hydrogen storage unit of the hydrogen storage apparatus of the invention is made of the material with high thermal conductivity, and the heat-dissipating partitions of the hydrogen storage unit can evenly divide the inner space of the housing. Accordingly, the heat generated in the hydrogen absorbing and releasing procedures can be conducted or removed from inside to outside or from outside to inside, thereby improving the thermal conduction efficiency of the hydrogen storage apparatus. In addition, since the heat-dissipating partition is configured with the second holes, hydrogen contained in the compartments of the hydrogen storage unit can rapidly follow in lateral so as to homogenously distribute in the hydrogen storage materials. This configuration can improve the hydrogen absorbing and releasing rates. Moreover, the grooves are configured with first holes and form radial hydrogen channels between the hydrogen storage unit and the housing, so that the hydrogen contained in the hydrogen storage unit can enter the radial hydrogen channels through the first holes and then flow longitudinally. Thus, the distribution of the hydrogen in the entire canister will be more uniform, and the poor gas fluidness can be prevented.

Furthermore, the hydrogen storage units can be stacked, so that the number of the hydrogen storage units can be freely adjusted according to the size of the canister and the required hydrogen capacity. Besides, the hydrogen storage powders can be separately arranged. If the hydrogen storage powders are stacked too high, the bottom powders of the hydrogen storage units will be compressed by the upper expanded powders during the hydrogen absorption procedure so as to decrease the stress release by expending upwardly of the bottom powders. Simultaneously, the stresses applied to the side wall or bottom of the hydrogen storage unit increase, which may potentially damage the hydrogen storage units. Moreover, the powders in the hydrogen storage units may be cracked after a certain number of hydrogen absorb-release cycles, so that the particle size of the powder becomes smaller. When the powders are stacked too high, the bottom powders will be compressed by the upper powders and thus easily be agglomerated. Since the hydrogen storage apparatus of the invention can separately arrange the hydrogen storage powders, the above issues about stresses and powder agglomeration can be solved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A hydrogen storage apparatus, comprising:
   a canister having at least a hollow rod; and
   at least one hydrogen storage unit disposed in the canister and comprising:
   a housing, wherein a periphery of the housing is configured with a plurality of grooves, and each of the grooves has a plurality of first holes,
   a heat-dissipating channel located within the housing, wherein the heat-dissipating channel is telescoped on the hollow rod, and
   a plurality of heat-dissipating partitions having a plurality of second holes and connecting to the housing and the heat-dissipating channel, wherein the heat-dissipating partitions divide an inner space of the housing, and the first holes and the second holes connect to the inner space of the housing.

2. The hydrogen storage apparatus of claim 1, wherein the grooves are separately disposed.

3. The hydrogen storage apparatus of claim 1, wherein the shape of the housing fits the canister.

4. The hydrogen storage apparatus of claim 1, further comprising:
   a cap having an opening and tightly connected with the canister.

5. The hydrogen storage apparatus of claim 4, further comprising:

at least a sealing element disposed at the cap and the at least one hydrogen storage unit.

6. The hydrogen storage apparatus of claim 4, wherein the cap comprises a top cap body and a bottom cap body, the top cap body and the bottom cap body are engaged with each other, and a gas route is configured between the top cap body and the bottom cap body.

7. The hydrogen storage apparatus of claim 1, wherein the heat-dissipating partitions are arranged in one of net construction, a radiating shape construction and a grid construction.

8. The hydrogen storage apparatus of claim 1, wherein the housing has an engagement structure including an engaging protrusion and an engaging recess, the engaging protrusion is disposed at one end of the housing, and the engaging recess is disposed at the other end of the housing.

9. The hydrogen storage apparatus of claim 8, wherein when the hydrogen storage apparatus comprises a plurality of the hydrogen storage unit, the hydrogen storage units are stacked and mounted on the hollow rod by the engagement structure.

10. The hydrogen storage apparatus of claim 9, wherein the grooves of the adjacent hydrogen storage units are aligned with each other.

11. The at least one hydrogen storage apparatus of claim 1, wherein the hydrogen storage unit further comprises:
a filtering element disposed on the first holes and having a plurality of filter holes.

12. The hydrogen storage apparatus of claim 11, wherein the diameter of each of the filter holes of the filtering element is between 0.5 µm and 1 µm.

13. The hydrogen storage apparatus of claim 1, further comprising:
at least an elastic element telescoped on the hollow rod and contacted against the at least one hydrogen storage unit.

* * * * *